United States Patent
Attaluri et al.

(10) Patent No.: US 9,367,556 B2
(45) Date of Patent: *Jun. 14, 2016

(54) HASHING SCHEME USING COMPACT ARRAY TABLES

(71) Applicant: International Business Machines Corporation, Armonk, NY (US)

(72) Inventors: Gopi K. Attaluri, San Jose, CA (US); Ronald J. Barber, San Jose, CA (US); Vijayshankar Raman, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/918,313

(22) Filed: Jun. 14, 2013

(65) Prior Publication Data

US 2014/0372388 A1 Dec. 18, 2014

(51) Int. Cl.
*G06F 17/30* (2006.01)

(52) U.S. Cl.
CPC ...... *G06F 17/30153* (2013.01); *G06F 17/3033* (2013.01); *G06F 17/30584* (2013.01)

(58) Field of Classification Search
CPC .................................................. G06F 17/3033
USPC ........................................................ 707/693
See application file for complete search history.

(56) References Cited

U.S. PATENT DOCUMENTS

| | | |
|---|---|---|
| 5,598,559 A | 1/1997 | Chaudhuri |
| 5,893,086 A | 4/1999 | Schmuck et al. |
| 5,930,785 A | 7/1999 | Lohman et al. |
| 6,026,394 A | 2/2000 | Tsuchida et al. |
| 6,052,697 A | 4/2000 | Bennett |
| 6,292,795 B1 | 9/2001 | Peters et al. |
| 6,505,189 B1 | 1/2003 | On Au et al. |
| 6,609,131 B1 | 8/2003 | Zait et al. |
| 6,757,677 B2 | 6/2004 | Pham et al. |
| 6,775,681 B1 | 8/2004 | Ballamkonda et al. |
| 6,941,432 B2 | 9/2005 | Ronstrom |
| 6,954,776 B1 | 10/2005 | Cruanes et al. |
| 7,062,481 B2 | 6/2006 | Pham et al. |
| 7,287,131 B1 | 10/2007 | Martin et al. |
| 7,293,028 B2 | 11/2007 | Cha et al. |
| 7,308,539 B2 | 12/2007 | Fuhs et al. |

(Continued)

OTHER PUBLICATIONS

Cleary, John, G., "Compact Hash Tables Using Bidirectional Linear Probing", IEEE Transactions on Computers, vol. C-33, No. 9, Sep. 1994, pp. 824-834.

(Continued)

*Primary Examiner* — Rehana Perveen
*Assistant Examiner* — Hicham Skhoun
(74) *Attorney, Agent, or Firm* — Mohammed Kashef; Edell, Shapiro & Finnan, LLC

(57) ABSTRACT

Embodiments include a method, system, and computer program product for creating an array table. In one embodiment the method includes identifying keys associated with values in a database and identifying bits common between the plurality of keys using logical functions and removing the common bits to form condensed keys. The method also includes modulating the condensed keys using identified common bits to create transformed keys and populating the plurality of array tables using the transformed keys and associated values.

17 Claims, 3 Drawing Sheets

(56) References Cited

U.S. PATENT DOCUMENTS

| | | | |
|---|---|---|---|
| 7,343,363 | B1 | 3/2008 | Parker |
| 7,499,960 | B2 | 3/2009 | Dageville et al. |
| 7,653,670 | B2 | 1/2010 | Hasan et al. |
| 7,827,182 | B1 | 11/2010 | Panigrahy |
| 7,827,218 | B1* | 11/2010 | Mittal ........................ 707/899 |
| 8,145,642 | B2 | 3/2012 | Cruanes et al. |
| 8,195,644 | B2 | 6/2012 | Xu |
| 8,271,564 | B2 | 9/2012 | Dade |
| 8,321,385 | B2 | 11/2012 | Burroughs et al. |
| 8,370,316 | B2 | 2/2013 | Bensberg et al. |
| 8,438,574 | B1 | 5/2013 | Lyle et al. |
| 8,443,155 | B2 | 5/2013 | Adams et al. |
| 8,661,005 | B2 | 2/2014 | McKenney et al. |
| 8,768,889 | B1 | 7/2014 | Martin |
| 8,768,927 | B2 | 7/2014 | Yoon et al. |
| 2002/0016820 | A1 | 2/2002 | Du Val et al. |
| 2004/0260684 | A1 | 12/2004 | Agrawal et al. |
| 2005/0018683 | A1* | 1/2005 | Zhao et al. ................... 370/393 |
| 2005/0033741 | A1 | 2/2005 | Dombroski et al. |
| 2006/0218176 | A1 | 9/2006 | Hsu et al. |
| 2007/0136317 | A1 | 6/2007 | Przywara |
| 2007/0244850 | A1 | 10/2007 | Hoppe et al. |
| 2007/0245119 | A1 | 10/2007 | Hoppe |
| 2008/0126706 | A1 | 5/2008 | Newport et al. |
| 2008/0133583 | A1 | 6/2008 | Artan et al. |
| 2008/0162402 | A1 | 7/2008 | Holmes et al. |
| 2009/0006399 | A1 | 1/2009 | Raman et al. |
| 2009/0024568 | A1 | 1/2009 | Al-Omari et al. |
| 2009/0210445 | A1 | 8/2009 | Draese et al. |
| 2009/0222659 | A1* | 9/2009 | Miyabayashi et al. ........ 713/156 |
| 2010/0088309 | A1 | 4/2010 | Petculescu et al. |
| 2010/0114868 | A1 | 5/2010 | Beavin et al. |
| 2010/0131540 | A1 | 5/2010 | Xu et al. |
| 2010/0223253 | A1 | 9/2010 | Gopal et al. |
| 2011/0060876 | A1 | 3/2011 | Liu |
| 2011/0066593 | A1 | 3/2011 | Ahluwalia et al. |
| 2011/0078134 | A1 | 3/2011 | Bendel et al. |
| 2011/0283082 | A1 | 11/2011 | McKenney et al. |
| 2012/0011108 | A1 | 1/2012 | Bensberg et al. |
| 2012/0011133 | A1 | 1/2012 | Faerber et al. |
| 2012/0011144 | A1 | 1/2012 | Transier et al. |
| 2012/0036134 | A1 | 2/2012 | Malakhov |
| 2012/0117055 | A1 | 5/2012 | Al-omari et al. |
| 2012/0136846 | A1 | 5/2012 | Song et al. |
| 2012/0136889 | A1 | 5/2012 | Jagannathan et al. |
| 2012/0143877 | A1 | 6/2012 | Kumar et al. |
| 2012/0158729 | A1 | 6/2012 | Mital et al. |
| 2012/0166400 | A1 | 6/2012 | Sinclair et al. |
| 2012/0173517 | A1 | 7/2012 | Lang et al. |
| 2012/0260349 | A1* | 10/2012 | Nagai et al. ...................... 726/28 |
| 2012/0303633 | A1 | 11/2012 | He et al. |
| 2012/0310917 | A1 | 12/2012 | Sheinin et al. |
| 2013/0138628 | A1 | 5/2013 | Bensberg et al. |
| 2013/0218934 | A1 | 8/2013 | Lin et al. |
| 2014/0006379 | A1 | 1/2014 | Arndt et al. |
| 2014/0025648 | A1* | 1/2014 | Corbett et al. ............... 707/692 |
| 2014/0074819 | A1 | 3/2014 | Idicula et al. |
| 2014/0108489 | A1* | 4/2014 | Glines et al. .................. 709/201 |
| 2014/0129568 | A1* | 5/2014 | Kim et al. ..................... 707/747 |
| 2014/0214794 | A1 | 7/2014 | Attaluri et al. |
| 2014/0214795 | A1 | 7/2014 | Attaluri et al. |
| 2014/0214855 | A1 | 7/2014 | Attaluri |
| 2014/0215019 | A1 | 7/2014 | Ahrens |
| 2014/0337375 | A1 | 11/2014 | Yue |
| 2014/0372392 | A1 | 12/2014 | Attaluri |
| 2014/0372407 | A1 | 12/2014 | Attaluri |
| 2014/0372470 | A1 | 12/2014 | Attaluri et al. |
| 2015/0154218 | A1 | 6/2015 | Attaluri |

OTHER PUBLICATIONS

Hua, Nan, et al., "Rank-Indexed Hashing: A Compact Construction of Bloom Filters and Variants", IEEE, 2008, pp. 73-82.

Xu, Yang, "A Multi-Dimesional Progressive Perfect Hashing for High Speed String Matching", 2011 Seventh ACM/IEEE Symposium on Architectures for Networking and Communications Systems, pp. 167-177.

Chang, Shih-Fu; "Recent Advances of Compact Hashing for Large-Scale Visual Search", Columbia University, Oct. 2012, pp. 1-44.

Wang et al.; "Investigating Memory Optimization of Hash-Index . . . Sequencing on Multi-Core Architecture", IPDPSW IEEE 26th Inter. Conf. on, May 21-25, 2012, pp. 665-674.

Cutt et al.; "Improving Join Performance for Skewed Databases", IEEE, 2008, 5 pages.

Li et al.; "Adaptively Reordering Joins during Query Execution", IEEE, 2007, pp. 26-35.

Marek et al., TID Hash Joins, CIKM '04, Gaithersburg MD USA, pp. 42-49.

Yan, Weipeng P. et al., "Performing Group-By before Join [query processing]," Proceedings 10th International conference on Data Engineering, 1994, pp. 89-100, IEEE, 1994.

Anonymous, "System and Method for Usage Aware Row Storage in Database Systems", IP.Com, Jul. 23, 2010, IPCOM000197960D, pp. 1-4.

Anonymous, "Efficient Grouping Over Joins of Compressed Tables", IP.com, Apr. 6, 2010, pp. 1-6.

Anonymous, "High Performance Technique Using Join Collocation in a Massively Parallel Processing Relational Database Implementation", IP.com, Jun. 14, 2012, pp. 1-5.

Anonymous, CashMap: Processor Cache-Aware Implementation of Hash Tables, IP.com, Jul. 5, 2013, pp. 1-7.

Hu et al., "Rapid multi-dimension hierarchical algorithm in data warehouse system", Computer Integrated Manufacturing Systems, Jan. 2007, pp. 196-201, vol. 13, No. 1 China [English-language translation: Abstract Only].

Korn et al., "The VCDIFF Generic Differencing and Compression Data Format (RFC3284)", Network Working Group, IP.com, Jul. 1, 2002, pp. 1-31.

Raman et al., "DB2 with BLU Acceleration: So Much More than Just a col. Store", Proceedings of the VLDB Endowment, ACM, Aug. 2013, pp. 1-12, vol. 6, No. 11.

Spyros et al., "Design and Evaluation of Main Memory Hash Join Algorithms for Multi-core CPU's", SIGMOD Int'l Conference on Management of Data ACM, Jun. 12, 2011, pp. 1-12.

U.S. Appl. No. 14/509,336, "Embracing and Exploiting Data Skew During a Join or Groupby", filed Oct. 8, 2014, 38 pages.

Mell, P., et al., "The NIST Definition of Cloud Computing", National Institute of Standards and Technology Special Publication 800-145, Sep. 2011, pp. 1-7, U.S. Department of Commerce.

Pandis, I. et al., "PLP: Page Latch-free Shared-everything OLTP", Proceedings of the 37th International Conference on Very Large Data Bases (VLDB Endowment), Aug. 29, 2011-Sep. 3, 2011, pp. 610-621, vol. 4, No. 10.

Sewall, J. et al., "PALM: Parallel Architecture-Friendly Latch-Free Modifications to B+ Trees on Many-Core Processors", Proceedings of the 37th International Conference on Very Large Data Bases (VLDB Endowment), Aug. 29, 2011-Sep. 3, 2011, pp. 795-806, vol. 4, No. 11.

Gao, H. et al., "Lock-free dynamic hash tables with open addressing", Journal of Distributed Computing, Jul. 2005, pp. 21-42, vol. 18, Issue 1.

Areias, M. et al., "A Simple and Efficient Lock-Free Hash Trie Design for Concurrent Tabling", Theory and Practice of Logic Programming, May 14, 2014, pp. 1-10, Arxiv.org, Cornell University Library.

Prokopec, A. et al., "Lock-Free Resizeable Concurrent Tries", Languages and Compilers for Parallel Computing, 2013, pp. 156-170, vol. 7146, Springer Berlin Heidelberg, Germany.

Levandoski, J., et al., "The Bw-Tree: A B-tree for New Hardware Platforms", IEEE 29th International Conference on Data Engineering (ICDE), Apr. 8, 2013, pp. 1-12, IEEE.

Leis, V et al. "The Adaptive Radix Tree: ARTful Indexing for Main-Memory Databases", IEEE 29th International conference on Data Engineering (ICDE), Apr. 8, 2013, pp. 38-49, IEEE.

Lehman, T.J. "Design and Performance Evaluation of a Main Memory Relational Database System." 1986, PhD Dissertation, 334 pages, [Abstract Only], University of Washington, Madison, WI.

* cited by examiner

HASHING SCHEME USING COMPACT ARRAY TABLES

BACKGROUND

The present disclosure relates generally to array tables used in database management, and more particularly to a hashing scheme using compact array tables.

A hash table is a data structure used to for management of data in computing environment. Hash tables often implement an associative array in order to build a structure that can map keys to values. A hash table uses a hash function to compute an index into an array of slots, from which the correct value can be found.

A hash function would want to optimally assign each possible key to a unique slot. Unfortunately, this is not always possible in many cases when data is processed dynamically and new entries are continuously added to the table, after it is created. In many instances, different keys are assigned unintentionally by the hash function to the same slot, creating a situation that is known as a collision. In some hash functions, schemes are implemented to minimize collisions. Others schemes assume that collisions are unavoidable and try to implemented ways to accommodate them.

A good hash function and implementation algorithm, are essential for hash table performance. A basic requirement of a good hash function is to provide a uniform distribution of hash values. A non-uniform distribution increases the number of collisions, and the cost of resolving them. Uniformity, however, is difficult to ensure, sometimes leading to pockets where data is more frequently disposed. The latter is often referred to as skewing and is another problem that needs to be addressed.

SUMMARY

Embodiments include a method, system, and computer program product for creating an array table. In one embodiment the method includes identifying keys associated with values in a database and identifying bits common between the plurality of keys using logical functions and removing the common bits to form condensed keys. The method also includes modulating the condensed keys using identified common bits to create transformed keys and populating the plurality of array tables using the transformed keys and associated values.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
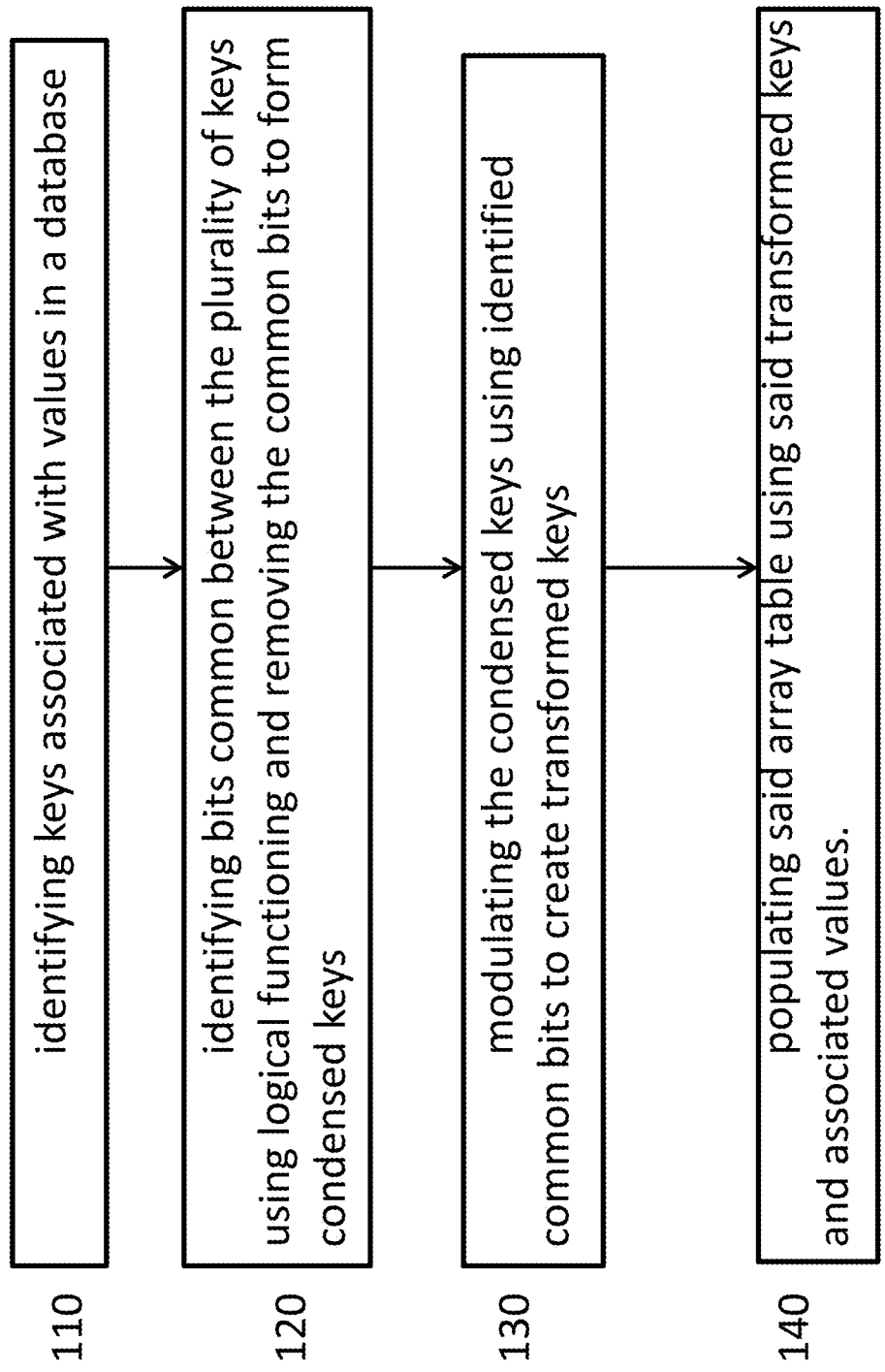
FIG. 1 depicts a process flow for a compact array table in accordance with an embodiment.

Embodiments described herein are directed to a hashing scheme which will be referenced as a compact array table (CAT) hashing scheme for ease of understanding. An example of such an array table is provided in the flow diagram of FIG. 1. In FIG. 1, an array table is created according to one embodiment. In block 110, keys associated with values in a database are identified. Proceeding to block 120, bits common between the plurality of keys are also identified using logical functioning and these common bits are removed to form condensed keys. In block 130, the condensed keys are then modulated using identified common bits to create transformed keys. Finally in block 140, the array table is populated using the transformed keys and associated values.

Figure 3:
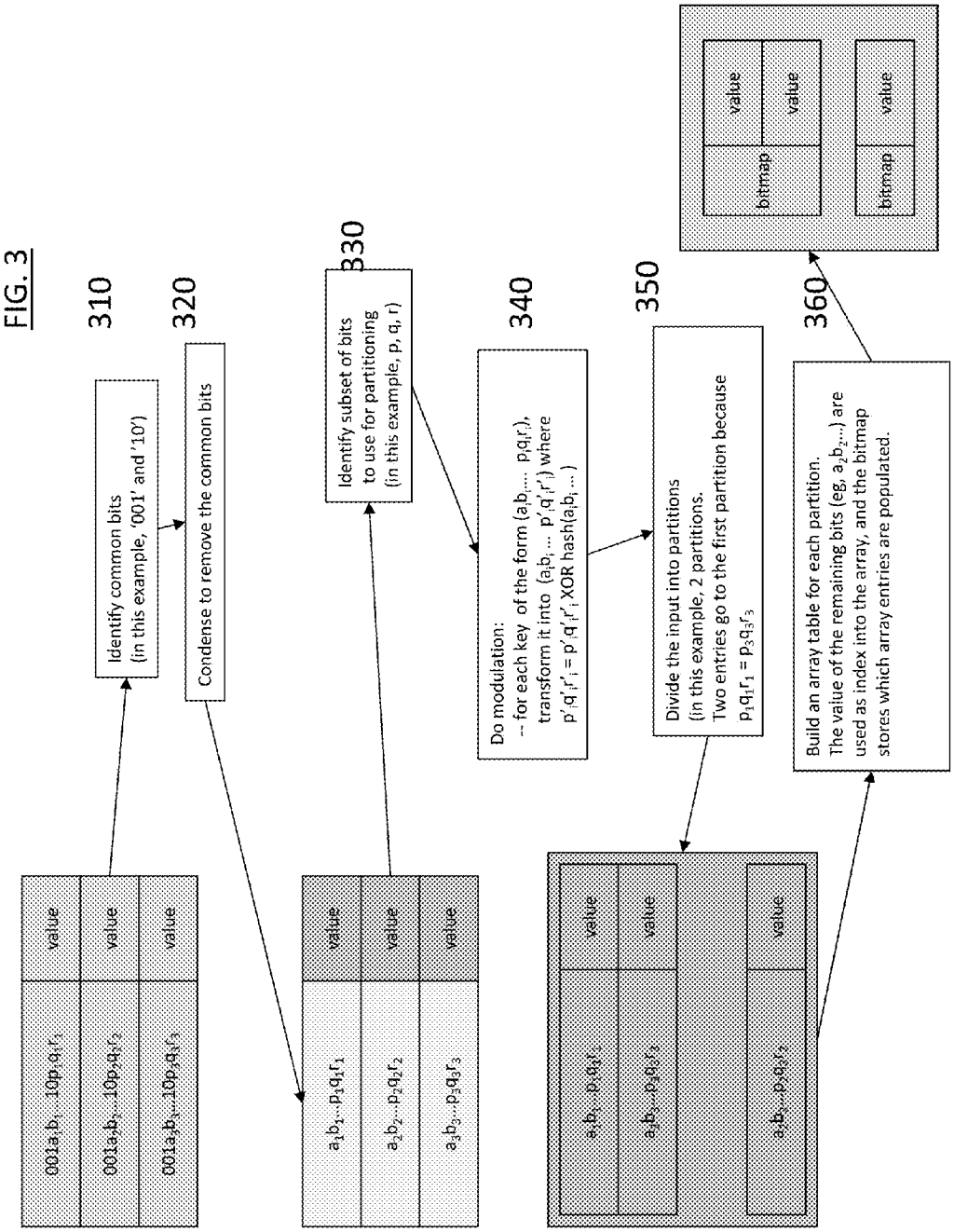
FIG. 3 provides a block diagram associated with the flow process discussed in conjunction with the embodiment of FIG. 1.

FIG. 3 is a block diagram associated with the CAT as shown in the embodiment of FIG. 1. In block 310 and block 320 common bits are identified and condensed similar to block 120 of FIG. 1 and numerical examples are provided for ease of clarity. In block 330 the subset of bits are identified for partitioning and modulation is provided in block 340 similar to block 130. Proceeding to block 350 and 360 an array table is built and populated using the partitioned input.

The embodiments of FIGS. 1 and 3 as discussed provide many advantages as will be discussed in more detail. Using the CAT scheme provided in FIGS. 1 and 3 minimizes collisions. Collisions are a huge problem in hash tables. Under the techniques provided by the prior art, hash collisions are practically unavoidable when hashing a random subset of a large set of possible keys. Statistically, when a sufficient number of keys are hashed into a large number of slots, even with a perfectly uniform random distribution, there is a good chance that at least two or more of the keys being hashed are provided to the same slot. Therefore, most hash table implementations have some collision resolution strategy to handle such events.

Some common strategies utilized by the prior art are open addressing, closed addressing and cuckoo addressing but most of these techniques provide additional challenges. For example, in a closed addressing strategy, a method also known as separate chaining, each slot is independent and has some sort of list of entries with the same index. In an open addressing strategy, by contrast, all entry records are stored in the array (slot) itself. When a new entry has to be inserted, the slots are examined, starting with the hashed-to slot until an unoccupied slot is found. When searching for an entry, the slots are scanned in the same sequence, until either the target or an unused array is found. The name "open addressing" refers to the fact that the location ("address") of the item is not determined by its hash value. Another alternative open-addressing solution is cuckoo hashing, which ensures constant lookup time in the worst case, and constant amortized time for insertions and deletions.

Despite the prior art methods such as the ones suggested above, collisions still remain a major problem that affect performance. Both open and closed addressing tables are still affected, the latter being affected in terms of chain length. Many of the similar schemes also have other disadvantages, in that they involve twice the number of random accesses of regular hash tables. Most schemes provided to minimize collisions have proved to be mostly unsuccessful and at the same time expensive.

A critical statistic for a hash table is called the load factor. This is simply the number of entries divided by the number of slots, that is, the ratio n/k where n is the number of entries and k is the number of slots. If the load factor is kept reasonable, the hash table should perform but when the load factor grows too large, the hash table will become slow or even fail completely. A low load factor may not always be beneficial because as the load factor approaches zero, the proportion of unused areas in the hash table increases but there may not always be a reduction in search cost which leads to wasted memory. In addition, the variance of number of entries per slot is important. For example, if two tables both have X number of entries and X slots with one having has exactly one entry in each slot while the other has all entries in the same slot, it becomes obvious that the latter will experience performance problems. For these reasons, there is a constant tradeoff between the hash table size and hash function complexity.

Referring back to FIG. 1, the CAT hashing scheme provided in this embodiment provides for a sparse hash table. This means that there would be many more slots than provided by the hash keys. The smaller the size of hash table/ number of keys, the more work is needed to make hash function perfect or deal with collisions. In one embodiment, such as the one discussed in conjunction with FIG. 1, a sparsely filled bitmap hashing scheme is provided. One example will now be used for ease of clarity with the understanding that alternate embodiments are possible. In this example, the hashing scheme provides for a compact hash table (HT) that only contains an entry for the used (1-bits) slots in the bitmap. Thus the size of compact HT is exactly equal to the actual number of keys. Furthermore, because the HT is collision-free, there is no need to store the keys but only the hash payloads. Payload is the part of a data stream which provides key information. Overhead data such as headers or metadata that solely facilitate delivery are omitted in the definition of a payload.

Referring back to FIG. 1, in one embodiment of the present invention, bits of the key itself are used as part of the hash value. This is instead of using the hashing function itself. Keys are usually dense because database administrators (DBAs) choose good surrogate keys. Furthermore, when the database management systems (DBMS) employ dictionary encoding, the encoded form of the key can be used which is even denser. The embodiment of FIG. 1, provides many advantages. One advantage is that there is no to compute a hash value an even when more traditional hashing schemes are used, the scheme has the advantage of avoiding wasting slots by compaction.

In one embodiment, logical reasoning such as in the form of computing a bitwise OR and/or a bitwise AND of all the keys is employed. This is to identify bits of the key that are constant (0s in the bitwise OR correspond to bits that are 0 in all keys, 1s in the bitwise AND are bits that are 1 in all keys). Subsequently the scheme condenses out those bits only and any remaining bits are used as the hash value to index into the bitmap. Thus this bitmap is highly dense. For example, suppose a two-column key array is utilized and that both columns are 32-bit numbers. The values in the first column range from 0 to 10M and those in the second column range from 0 to 1000. In performing the concatenation, out of 64 bits only $(\log(10M)+\log(1000))=34$ bits refer to non-empty slots. In addition, suppose that the scheme partitions the keys on the 10 bits from the LSB side (e.g., as part of doing a partitioned join). Then, even out of these 34 bits, 10 bits will be constant in all keys. So effectively, there is only a need to employ a bitmap of size 2 by 24 bits or 2 MB.

Skewing provides a challenge in hashing and in all computer environments that utilize memory partitioning. Skewing can be thought of as an asymmetry of data in the distribution of the data values across partitions such that there is more data in one partition than a second partition. This leads to performance problems and it is desired to design a system where the data values are distributed uniformly or near uniformly across different partitions.

In the CAT scheme, in one embodiment, the challenge of skew in partitioning is handled in a number of ways. In one embodiment, to make the bitmap small, the design is to provide partitioning on the bits of the key itself, instead, for example on the hash key. However, this may not completely address the skewing issues entirely. To further ensure against skews in partitioning, logical partitioning can be used in one example as will be discussed. Suppose a scenario where the key has N bits of which and it is desired to use P bits for partitioning. A hash of the other N-P bits is then computed and logical functions such as a xor are used with the P bits that are going to be used for partitioning. This is a bijective transformation (collision-free), so it is correct to perform the join predicate on the transformed key. At the same time, there are P bits for partitioning that are based on a hash and thus skew tolerant.

The CAT scheme also deals with handling empty payloads. A degenerate but common case in joins is where there is no payload. In this case, there is no array-table, but simply the scheme uses bitmap to filter out outer tuples that do not have a match.

The straightforward method to build a CAT requires two passes over the join keys. The first determines the maximum condensation possible, and whether CAT is applicable. If CAT is chosen based on the first pass results, the second pass kicks in. In this second pass, all the join keys are condensed.

The second assumption implies that CAT would be chosen most of the time, except when the bit-size of the encoded join columns is increased beyond the pre-computed statistics of the largest key (i.e. how many bits are used). This exception forbids all keys from being condensed in the first pass. However, a second pass should be avoided because it could result in incorrect results if some keys are condensed but others are not because of non-CAT column values. In other words "Correctness" rules could be violated because a condensed key could be identical to a non-CAT column value. The condensation could be performed, however, (in the first pass with the second pass eliminated) by applying the following changes:

a) Condense if and only if no join column has a non-CAT value. If the join key is condensed, set the MSB, otherwise clear it.
  b) Disable CAT and terminate the first pass if any join key could not be condensed. Undo the condensation and restore the original keys with MSB cleared. This should be rare but necessary for correctness.

On the build side, the analysis and condensation can also be performed to join keys. In one embodiment, based on the catalog data decide whether CAT is applicable to the join. After this, it would be disabled only in the rare case (presence of non-CAT values). If the CAT is applicable, perform these additional steps while concatenating a column value to a join key:

a) No CAT processing for unencoded keys/rows. Clear their MSB (which should be done during memory allocation anyway).
  b) For the encoded keys/rows, check if any column value is non-CAT (cheap integer comparison when check encodability of the row). If so, disable CAT and terminate its further processing.
  c) While concatenating an encoded key, condense each concat column based on the catalog data. If CAT is disabled for any reason, the condensed keys must be undone by the build evaluator. This should be rare. This optimization avoids the extra analysis in the build evaluator.

Figure 2:
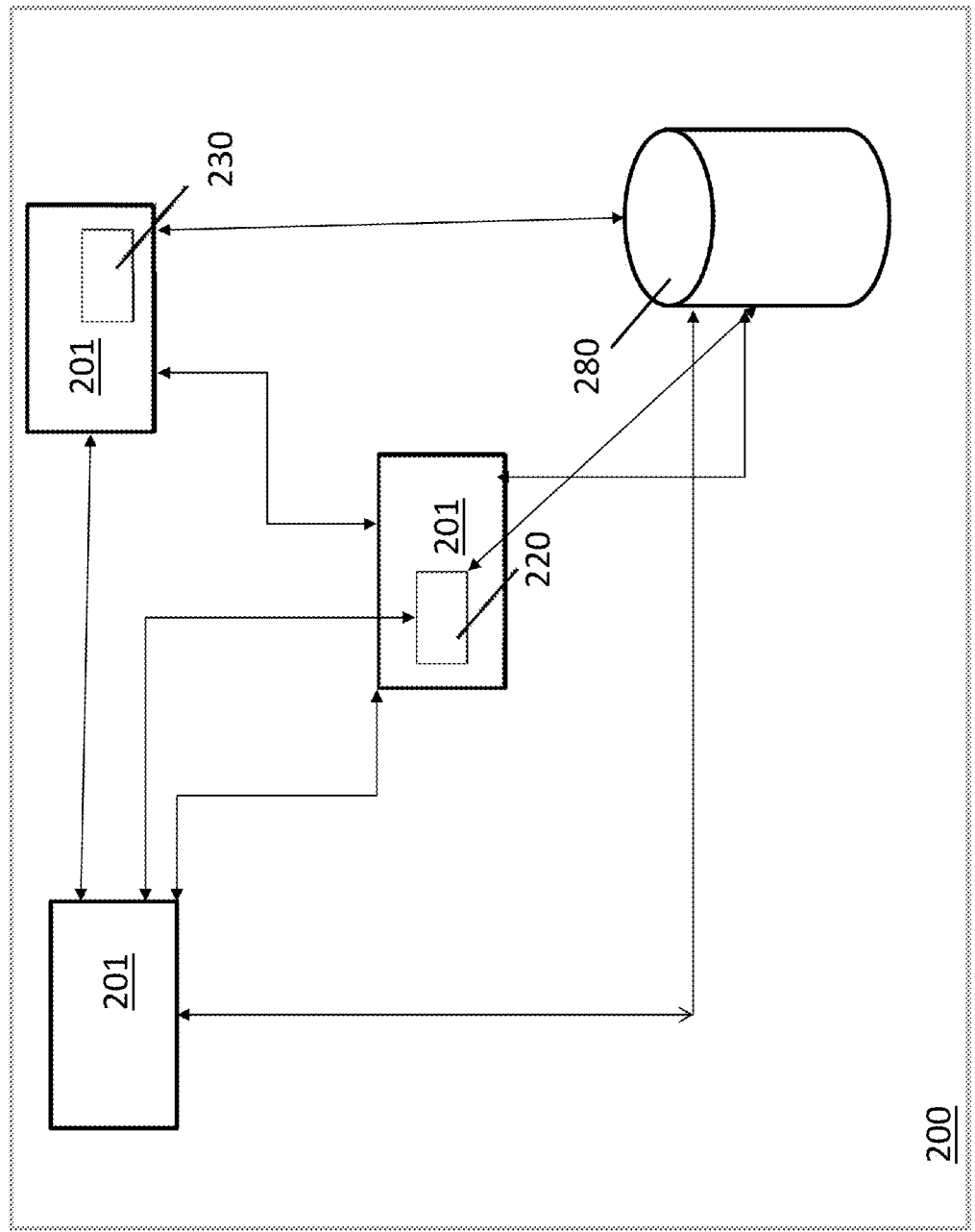
FIG. 2 depicts a block diagram showing a system that can be used in accordance with an embodiment.

FIG. 2 is a block diagram illustration of a computing environment as per one embodiment of the present invention having a facilitated network system 200. As illustrated in FIG. 2, the system comprises a plurality of nodes 201 that are in processing communication with one another. This communication can be enabled through wired or wireless processing or other alternate means as can be appreciated by those skilled in the art. Each node 201 can also include one or more processors 230. Each node 201 can include its own internal memory as shown at 220, or be in processing communication with that node's internal memories, or in communication with one or more external memories such as the one shown in FIG. 2 at 280. The system memories 220 and 280 can also be in communication directly with one another or through the node and either be comprised of a single unit that is shared among the many nodes 201 or be comprised of a plurality of components that are in processing communication with one another. In this manner, each node 201 can either exclusively use a single memory or alternatively use multiple memories at the same time or at different times to achieve processing optimization.

In one embodiment, one or nodes 201 or processors 230 can be used while in processing communication with one another one of the memories such as 220 or 280 to provide instructions for carrying out the techniques discussed above such as the processor identifying keys associated with values in a database. Bits common between the plurality of keys are also identified by the processor using logical functioning and removed to form condensed keys. One or more of the nodes including their processors can be operated as a modulator for modulating identified common bits to create transformed keys. The array table is then populated using the transformed keys and associated values.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for creating a plurality of array tables, the computer program product comprising: a non-transitory computer readable storage medium having program code embodied therewith, the program code comprising instructions that when executed by a processor cause the processor to:
   identifying keys in a database, the keys each having an associated value;
   identifying bits that are assigned common values between the keys;
   removing the identified bits to form condensed keys;
   modulating the bits of the condensed keys until at least a subset of the modulated bits of the condensed keys have a uniform distribution;
   replacing the subset of the modulated bits in each of the condensed keys with a result obtained by applying a particular function to both the subset of the modulated bits and remaining bits of each of the condensed keys not in the subset;
   associating each replaced subset of modulated bits with each of a plurality of partitions based on the value of the replaced subset of modulated bits such that all keys with a same value for the replaced subset of modulated bits will be disposed in the same partition; and
   using any remaining bits of the modulated condensed keys and the associated values in each partition to populate the corresponding one of the array tables associated with that partition.

2. The computer program product of claim 1, wherein the program code includes instructions that cause the processor to modulate the bits of the condensed keys using a logical function.

3. The computer program product of claim, 2 wherein the program code includes instructions that cause the processor to apply an XOR operation as the logical function.

4. The computer program product of claim 1, wherein the program code includes instructions that cause the processor to accept Structured Query Language (SQL).

5. The computer program product of claim 1, wherein the program code includes instructions that cause the processor to identify the identified bits using an OR logical function to find the bits that are always assigned the common value of zero.

6. The computer program product of claim 1, wherein the program code includes instructions that cause the processor to identify the identified bits using an AND logical function to find the bits that are always assigned the common value of one.

7. The computer program product of claim 1, wherein the program code includes instructions that cause the processor to determine values based on payload data associated with zero or more columns from the database.

8. The computer program product of claim 1, wherein the program code includes instructions that cause the processor to organize the array table into rows and columns where the value of the remaining bits is used as an index into the array table, and only the associated values are stored in the array table.

9. The computer program product of claim 1, wherein the program code includes instructions that cause the processor to form the keys by a concatenation of one or more columns of a database table.

10. The computer program product of claim 8, wherein the program code includes instructions that cause the processor to perform a first scan over the keys to determine a maximum condensation.

11. The computer program product of claim 9, wherein the program code includes instructions that cause the processor to whether there are any restrictions that do not allow any keys to be condensed.

12. The computer program product of claim 11, wherein the program code includes instructions that cause the processor to perform a second scan operation upon determination that no restrictions exist and the keys can be condensed, the second scan is operation being performed to condense all the keys.

13. The computer program product of claim 12, wherein the program code includes instructions that cause the processor to determine the existence of the restriction, by checking if a bi>size of condensed keys exceeds a threshold and using pre-computed statistics by calculating a largest key amongst the keys.

14. The computer program product of claim 1, wherein the program code includes instructions that cause the processor to deem the keys without any associated values as representing empty payloads and to exclude the keys without any associated values from being used to populate the plurality of array tables.

15. The compute program product of claim 1, wherein the program code includes instructions that cause the processor to use the array tables for lookup of keys in a database operation.

16. A system for creating a plurality of array tables, comprising at least one processor that:
   identify keys in a database, the keys each having an associated value;
   identify bits that are assigned common values between the keys;
   remove the identified bits to form condensed keys;
   modulate the bits of the condensed keys until at least a subset of the modulated bits of the condensed keys have a uniform distribution;
   replace the subset of the modulated bits in each of the condensed keys with a result obtained by applying a particular function to both the subset of the modulated bits and remaining bits of each of the condensed keys not in the subset;
   associate each replaced subset of modulated bits with each of a plurality of partitions based on the value of the replaced subset of modulated bits such that all keys with a same value for the replaced subset of modulated bits will be disposed in the same partition; and
   using any remaining bits of the modulated condensed keys and the associated values in each partition to populate the corresponding one of the array tables associated with that partition.

17. The system of claim 16, wherein the processor is a processor that modulate the condensed bits using a logical function.

* * * * *